United States Patent Office 3,450,675
Patented June 17, 1969

3,450,675
FLAME RETARDANT POLYURETHANES FROM PHOSPHONITRILIC ESTERS AND THEIR PREPARATION
Roger W. Ashworth, Altrincham, and Alec V. Mercer, Cheadle, England, assignors to Shell Oil Company, New York, N.Y., a corporation of Delaware
No Drawing. Filed June 14, 1965, Ser. No. 463,876
Claims priority, application Great Britain, June 29, 1964, 26,727/64
Int. Cl. C08g 22/14, 33/16
U.S. Cl. 260—77.5     5 Claims

ABSTRACT OF THE DISCLOSURE

Polyurethanes having flame retardant and humid aging properties are prepared by reaction of polyisocyanates with cyclic phosphonitrilic esters.

---

This invention relates to polyurethanes and their preparation. More particularly, the invention relates to polyurethanes having flame retardant and satisfactory humid aging properties.

It is well known that polyurethanes may be prepared by reacting an organic polyfunctional isocyanate or isothiocyanate with an organic polyhydroxy compound. Generally, the polyurethanes are prepared by a one-stage or a two-stage process. In the latter process a polyurethane "prepolymer" is prepared by reacting the organic polyfunctional isocyanate or isothiocyanate with an organic polyhydroxy compound. While the prepolymer may be molded or cast directly into sheets or converted to other products it is particularly useful as an intermediate for preparing a cross-linked polyurethane "plastic" by methods known to those skilled in the art.

In the direct method or one-stage process often referred to as the "one-shot" method the organic polyisocyanate or polyiscothiocyanate is reacted with the polyhydroxy compound under such conditions that the desired cross-linked polyurethane plastic is obtained.

The polyurethane plastics are particularly useful when in the form of the cellular materials commonly known as polyurethane foams which, depending upon their physical properties, find particular application as insulating and shock-absorbing materials which may be used for many purposes in industry. Depending on the nature of the starting materials and the conditions under which the polyurethane foams are prepared it is possible to produce rigid foams suitable, for example, for heat insulation and resilient foams of various degrees of resilience suitable, for example, for shock absorption and for seat coverings, carpet underlays and many other purposes including, in the case of open-cell resilient foams, sound insulation. In general, polyurethane foams can be prepared by "blowing" the reaction mixture during the conversion of a prepolymer into a polyurethane plastic, or, in the case of the one-shot method, by blowing the reaction mixture in which the polyurethane plastic is produced from starting materials comprising a polyisocyanate or polyisothiocyanate and an organic compound having in the molecule a plurality of active hydrogen atoms. In either case blowing can be accomplished for example by such techniques as generating a gaseous blowing agent, e.g., carbon dioxide in situ in the reaction mixture or by supplying a gaseous blowing agent such as air thereto. In the case of the one-shot method, the reactants are usually mixed in a so-called mixing head fitted with a stirrer capable of rotation at speeds of the order of 2000 to 5000 r.p.m. In addition to promoting rapid and thorough mixing of the reactants the action of the stirrer also aids foam formation.

Polyurethane foams having flame retardant or self-extinguishing properties are often highly desirable or even necessary for many applications. Attempts to impart fire retardant properties to these foams by incorporating additives therein such as tris-beta-chloroethyl phosphate, glycerol-epichlorohydrin adducts, antimony oxide, etc. has not been entirely satisfactory. Such additives lose their effectiveness with age and the foams containing them do not have suitable humid aging properties. To overcome these problems attempts have been made to prepare polyurethanes wherein the flame retardant properties are bound in the product. For example, organic polyhydroxy reactants such as phosphorus and/or halogen containing polyols have been reacted with the organic polyisocyanate or polyisothiocyanate to produce flame retardant polyurethanes. However, it has been previously found necessary to use polyols containing both phosphorus and halogens to obtain foams having self-extinguishing properties and satisfactory dimensional stability under humid conditions.

It is the principal object of this invention to provide polyurethane foams which have flame retardant properties and which are dimensionally stable under humid conditions and which do not contain halogens. These and other objects will become apparent from the following disclosure. Unless otherwise stated, the term "polyurethane" includes polyurethane foams.

It has now been discovered that polyurethanes which are flame retardant and have satisfactory humid aging properties are those prepared by reacting an organic polyisocyanate or an organic polyisothiocyanate with a phosphonitrilic ester of a polyol which has no hydrogen atoms directly attached to a beta-carbon atom.

The organic polyfunctional isocyanates or isothiocyanates used to prepare the polyurethanes are those having the general formula

$$R(NCX)_{n+1}$$

wherein R represents a polyvalent organic radical, X represents an oxygen or sulfur atom and $n$ is an integer of at least 1, i.e., 1, 2, 3, 4, etc.

The organic polyisocyanate or polyisothiocyanate may be an aliphatic, cycloaliphatic or aromatic compound or a derivative thereof provided any such derivative contains no substituent which interferes with the reaction. Thus, if desired, it may be used in the form of a functional derivative containing "masked" or "blocked" isocyanato or isothiocyanato groups, free isocyanato or isothiocyanato groups being formed from "masked" or "blocked" groups by the action of heat. Examples of such functional derivatives include dissociable polymers such as dimers, dissociable addition products of organic polyisocyanates or polyisothiocyanates with phenol, and non-dissociable addition products of organic polyisocyanates or polyisothiocyanates with suitable aliphatic polyhydroxy compounds, such as, for example, dimethylol propane, trimethylol propane and glycerol. It should be noted that in the non-dissociable addition products certain free isocyanato or isothiocyanato groups are present, but they are sterically hindered to such a degree that they are substantially unreactive at ordinary room temperatures, though they can react at a useful rate if heat is applied. The dissociable polymers and dissociable and non-dissociable addition products can be useful in reducing toxicity risks.

Advantageously, a difunctional organic isocyanate is used. Examples of suitable isocyanates and isothiocyanates are polymethylene diisocyanates and diisothiocyanates, such as ethylene diisocyanate, trimethylene diisocyanate, tetramethylene diisocyanate and pentamethylene diisocyanate; and the corresponding diisothiocyanates, alkylene diisocyanates and diisothiocyanates, such as propylene-1,2-diisocyanate, butylene - 1,2 - diisocyanate, butylene-1,3-diisocyanate, butylene-2,3-diisocyanates, and butylene-1,3-diisothiocyanate; alkylidene diisocyanate and diisothiocyanates, such as ethylidene diisocyanate, butylidene diisocyanate and ethylidene diisothiocyanate; cycloalkylene diisocyanates and diisothiocyanates, such as cyclopentylene - 1,3-diisocyanate, cyclohexylene-1,4-diisocyanate and cyclohexylene-1,2-diisothiocyanate; cycloalkylidene diisocyanates and diisothiocyanates, such as cyclopentylidene diisocyanate, cyclohexylidene diisocyanate and cyclohexylidene diisothiocyanate; aromatic diisocyanates and diisothiocyanates, such as metaphenylene diisocyanate, paraphenylene diisocyanates, 1-methyl-2,4-phenylene diisocyanate, naphthylene-1,4-diisocyanate, diphenylene-4,4'-diisocyanate or p-phenylene diisothiocyanate; aliphatic-aromatic diisocyanates or diisothiocyanates, such as xylylene-1,4-diisocyanate, xylylene-1,3-diisocyanate, 4,4'-diphenylenemethane diisocyanate, 4,4'-diphenylenepropane diisocyanate, xylylene-1,4-diisothiocyanate or durene diisocyanate. While any polyisocyanate or polyisothiocyanate of the general formula $$R(NCX)_{n+1}$$

may be employed, aromatic diisocyanates are preferred. Toluene diisocyanate or isomeric mixtures thereof are preferred for production of flexible or semi-rigid foams and p,p'-diphenylmethane diisocyanate is preferred for rigid polyurethane foam production.

As set forth above, the hydroxy reactant which is reacted with the organic polyisocyanate or polyisothiocyanate comprises a phosphonitrilic ester of a polyol having no hydrogen atoms directly attached to a beta-carbon atom. Preferred polyols of this description are those containing from 5 to about 20 carbon atoms and having from 2 to 4 hydroxyl groups. Suitable polyols may be selected from:

(a) 2,2-dihydrocarbyl-propane-1,3-diols wherein the hydrocarbyls may be alkyl, cycloalkyl or aryl radicals, such as, neopentyl glycol, 2-ethyl-2-methylpropan-1,3-diol, 2,2 - diethylpropan - 1,3-diol, 2-isopropyl-2-methylpropan-1,3-diol, 2-cyclohexyl-2-methylpropan-1,3-diol, 2-methyl-2-phenylpropan-1,3-diol, 2-cyclohexyl - 2 - phenylpropan-1,3-diol, etc.

(b) 2-hydrocarboxy-2-hydrocarbyl-propan - 1,3 - diols, such as, 2-methoxy-2-methylpropan-1,3-diol, 2-ethoxy-2-ethylpropan - 1,3 - diol, 2-methyl-2-n-propoxypropan-1,3-diol, 2-isopropoxy-2-methylpropan-1,3-diol, 2-n-butyl-2-methoxypropan - 1,3 - diol, 2-ethyl-2-phenoxypropan-1,3-diol, etc.

(c) 2-hydrocarbyl-2-hydroxyalkylpropan-1,3-diols, such as, 2-methyl-2-hydroxymethylpropan-1,3-diol, 2-ethyl-2-hydroxymethylpropan-1,3-diol, etc.

(d) 1,1-di(hydroxyalkyl)cycloalkanes such as 1,1-di(hydroxymethyl)cyclopentane, 1,1-di(hydroxymethyl)cyclohexane, 1,1 - di(hydroxymethyl)cyclooctane, 1,1 - di(hydroxymethyl)cyclododecane, etc.

(e) 2,2,4,4,6,6-hexalkylcyclohexan-1,3-diols and 2,2,4,4,6,6-hexalkylcyclohexan-1,3,5-triols such as 2,2,4,4,6,6-hexamethylcyclohexan-1,3-diol, 2,2,4,4,6,6-hexamethylcyohexan-1,3,5-triol, etc.

(f) pentaerythritol.

Groups (a) and (b) are the preferred polyether polyols and especially those wherein the hydrocarbyl groups are alkyls, e.g., 2,2-dialkylpropan-1,3-diols and 2-alkoxy-2-alkylpropan-1,3-diols.

The phosphonitrilic esters are prepared by reacting a phosphonitrilic halide of the general formula $(PNCl_2)_n$ or $(PNBr_2)_n$ where $n$ is an integer of at least 3 and preferably no more than 20 with the polyols set forth above. Preferred phosphonitrilic halides are 2,2,4,4,6,6-hexachlorocyclotriphosphazene and 2,2,4,4,6,6,8,8-octachlorocyclotetraphosphazene. Mixtures of these phosphonitrilic halides may also be used.

The phosphonitrilic polyol esters can be prepared by any known process. One suitable method comprises reacting the polyol with a phosphonitrilic halide in the presence of an alkali metal carbonate as set forth below. The amount of polyol used should be equal to or substantially equal to the amount necessary for complete conversion of the phosphonitrilic halide to the corresponding phosphonitrilic polyol ester. The product may consist of a mixture of esters.

The hydroxy reactant used to react with the organic polyisocyanate or polyisothiocyanate may, in addition to the phosphinitrilic polyol esters, consist of a polyol which does not contain phosphorus in its molecular structure and is selected from a polyester polyol or a polyether polyol, the latter being preferred.

Suitable polyether polyols can be prepared, for example, by reacting an alkylene oxide with a nucleating agent to give an adduct wherein at least two of the active hydrogen atoms of the nucleating agent are replaced by hydroxy terminated polymeric chains containing oxyalkylene radicals. Among the alkylene oxides which can be used to prepare polyether polyols are ethylene oxide, propylene oxide, 1-butene oxide, etc. Examples of nucleating agents which may be used are water, monopropylene glycol, glycerol, sorbitol and sucrose. Specific examples of suitable polyether polyols which may be used in the hydroxy reactant in addition to the phosphonitrilic polyol esters are polyethylene glycol, polypropylene glycol, glycerol-propylene oxide adducts, sorbitol-propylene oxide adducts and sucrose-propylene oxide adducts.

Examples of polyesters polyols are those prepared by reacting a polyhydric alcohol with a polycarboxylic compound such as polycarboxylic acids (succinic acid, adipic acid, phthalic acid, etc.) or their anhydrides.

In preparing the flame retardant polyurethane foams of the invention, the single stage or one-shot method described above is preferred. The organic polyisocyanate or polyisothiocyanate and the hydroxy reactant are preferably reacted in a stoichiometric ratio (i.e., one isocyanate or isothiocyanate group for every active hydroxyl group) or up to a slight molar excess (from 5 to 10%) of either reactant. The materials are reacted under conditions well known to those skilled in the art.

The hydroxy reactant used in carrying out the present invention preferably contains from 2 to 5% phosphorus by weight and has a hydroxyl number between about 350 and 650 mg. potassium hydroxide/g.

In order to increase the rate of reaction between the organic polyisocyanate and/or organic polyisothiocyanate and the hydroxy reactant, the reaction is normally carried out in the presence of a catalyst, in particular, a tertiary amine such as triethylene diamine. A polyurethane having a foamed structure, i.e., a polyurethane foam is obtained as the result of the in situ evolution of a gas in the chemical reaction leading to polyurethane formation, or by the vaporization of a volatile liquid foaming agent such as the fluorochlorohydrocarbons, incorporated in the reaction mixture, or by a combination thereof. A foam stabilizer such as silicone oil is often incorporated into the reaction mixture.

The following examples are provided to illustrate the manner in which the invention is carried out. It is to be understood that the examples are for the purpose of illustration only and the invention is not to be regarded as limited to any of the specific compounds or conditions recited therein. Unless otherwise indicated, parts and percents disclosed in the examples are given by weight.

EXAMPLE I

The phosphonitrilic polyol ester was prepared as follows: 38.7 g. of a mixture of 75–80% 2,2,4,4,6,6-hexachlorocyclotriphosphazene and 20–25% 2,2,4,4,6,6,8,8-octachlorocyclotetraphosphazene was dissolved in 200 ml. of benzene. The solution was filtered and added slowly over a four hour period to a mixture of 80 g. 2-methoxy-2-methylpropan-1,3-diol and 69 g. potassium carbonate the reaction temperature being held at 80° C. The reaction was allowed to continue with stirring for an additional 16 hours after which the reaction mixture was filtered to remove the salts which were washed with hot benzene. The washing and the filtrate were combined and the benzene was removed by distillation. The product weighing 86.9 g. was a mixture of 2,2,4,4,6,6-hexa(2-hydroxymethyl-2-methoxypropanoxy)cyclotriphosphazene and 2,2,4,4,6,6,8,8-octa(2-hydroxymethyl - 2 - methoxypropenoxy)cyclotetraphosphazene having a hydroxyl number of 431 mg. KOH/g. and containing 11.57% phosphorus.

A hydroxy reactant having a phosphorus content of 5% and a hydroxyl number of 508 mg. KOH/g. was prepared by blending 67.3 parts of the mixture of phosphonitrilic polyol esters prepared above with 88.5 parts of a glycerolpropylene oxide adduct having a hydroxyl number of 566.1 mg. KOH/g.

A polyurethane foam was prepared by reacting the hydroxy reactant composition with technical p,p'-diphenylmethane diisocyanate which is sold under the trade designation "Caradate 30" and the foamed structure of the polyurethane foam was obtained by the vaporization of trichlorofluoromethane. The reaction formulation was:

| | Parts by weight |
|---|---|
| Hydroxy reactant | 100 |
| "Caradate 30" | 124 |
| Trichlorofluoromethane | 40 |
| Triethylamine | 1.5 |
| Triethylenediamine | 0.5 |
| Silicone oil L531 | 1.0 |

(A water organo-soluble silicone block copolymer of modate viscosity.)

The resulting polyurethane foam had the following properties:

Distortion on heat aging [1] —50° C. _____ Nil

Classification: self extinguishing.

[1] Heat aging distortion was determined by heating a 6″ x 1″ x 1″ sample for 16 hours and measuring the percentage increase in length.

Distortion on heat aging +93° C. _____ Nil
Distortion on humid aging [2] _____ Nil

[2] Humid aging distortion was determined by exposing a 6″ x 1″ x 1″ sample of the foam at a temperature of 100° F. and at a humidity of 100% for 168 hours and measuring the percentage increase in length.

Flame retardancy—length burned: [3] _____inches__ 1.67

[3] Flame retardance was determined by ASTM Test No. D-1692-59T.

EXAMPLE II

A solution of 116 g. of 2,2,4,4,6,6-hexachlorocyclotriphosphazene in 500 ml. of dioxane was added slowly to a mixture of 208 g. of neopentyl glycol, 276 g. potassium carbonate and 400 ml. of dioxane. The reaction was heated to 80° C. for 30 hours after which the reaction mixture was centrifuged to remove the salts. The dioxane was removed by distillation. The 2,2,4,4,6,6-hexa(2-hydroxymethyl-2-methylpropanoxy)cyclotriphosphazene obtained weighed 239 g. and had a phosphorus content of 12% and contained 6.2% nitrogen.

A hydroxy reactant was prepared by blending 81.4 g. of the phosphonitrilic polyol ester prepared above and 113.8 g. of a glycerolpropylene oxide adduct having a hydroxy number of 566.6 mg. KOH/g. The resulting hydroxy reactant had a phosphorus content of 5% and a hydroxyl number of 516 mg. KOH/g.

A polyurethane foam was prepared by reacting 400 g. of the hydroxy reactant with 126.5 g. p,p'-diphenylmethane diisocyanate in the presence of 40 g. trifluorochloromethane, 1.5 g. triethylamine, 0.2 g. triethylene diamine and 1.0 g. silicone oil (L531). The polyurethane foam had the following properties:

Distortion on heat aging [1] —50° C. _____ Nil
Distortion on heat aging +93° C. ____percent__ +0.4
Distortion on humid aging [2] _____do____ +0.4
Flame retardancy—length burned: [3] ___inches__ 1.25

[1] Heat aging distortion was determined by heating a 6″ x 1″ x 1″ sample for 16 hours and measuring the percentage increase in length.
[2] Humid aging distortion was determined by exposing a 6″ x 1″ x 1″ sample of the foam at a temperature of 100° F. and at a humidity of 100% for 168 hours and measuring the percentage increase in length.
[3] Flame retardance was determined by ASTM Test No. D-1692-59T.

EXAMPLE III

Classification: self-extinguishing.

The process of Example II was repeated except that in preparing the phosphonitrilic polyol ester, diipropylene glycol was used as the polyol. The hydroxy reactant which was a blend of a glycerol propylene oxide adduct and the phosphonitrilic polyol ester contained 5% phosphorus and had a hydroxyl number of 482. The polyurethane foam product although possessing good dimensional stability burned completely when tested for flame retardancy.

We claim as our invention:

1. A flame-retardant polypurethane having improved humid aging properties prepared by reacting (A) an organic polyfunctional compound selected from the group consisting of polyisocyanates and polyisothiocyanates with (B) a hydroxy reactant consisting essentially of a cyclic phosphonitrilic ester having no hydrogen atoms attached to a beta-carbon atom and prepared by reacting a phosphonitrilic halide selected from the group consisting of $(PNCl_2)_n$ and $(PNBr_2)_n$ wherein $n$ is an integer between 3 and 20 with a polyol containing from 5 to about 20 carbon atoms and having from 2 to 4 hydroxyl groups, said polyol being employed in an amount which is substantially equal to the amount necessary for complete conversion of the phosphonitrilic halid to the corresponding phosphonitrilic polyol ester.

2. A flame-retardant polyurethane as in claim 1 wherein the polyol is a glycerine-propylene oxide adduct.

3. A flame-retardant polyurethane as in claim 1 wherein the phosphonitrilic halide is selected from the group consisting of 2,2,4,4,6,6-hexachlorocyclotriphosphazene, 2,2,4,4,6,6,8,8-octachlorocyclotetraphosphazene and mixtures thereof.

4. A flame-retardant polyurethane as in claim 1 wherein the polyol is selected from the group consisting of 2,2-dialkylpropan-1,3-diols and 2-alkoxy-2 - alkylpropan - 1,3-diols.

5. A flame-retardant polyurethane as in claim 1 wherein the hydroxy reactant has a phosphorus content of from about 2 to about 5%.

References Cited

UNITED STATES PATENTS

| 2,214,769 | 9/1940 | Lipkin | 260—2 |
| 2,876,247 | 3/1959 | Ratz et al. | 260—927 |
| 3,197,464 | 7/1965 | Ottmann et al. | 260—239 |
| 3,206,494 | 9/1965 | Lund et al. | 260—927 |
| 3,142,651 | 7/1964 | Friedman | 260—2.5 |

DONALD E. CZAJA, Primary Examiner.

M. J. WELSH, Assistant Examiner.

U.S. Cl. X.R.

260—2.5, 75